Oct. 17, 1944. R. C. THOMPSON 2,360,595
APPARATUS FOR REMOVING SOLID PARTICLES FROM AIR STREAMS
Filed Oct. 1, 1940 2 Sheets-Sheet 1
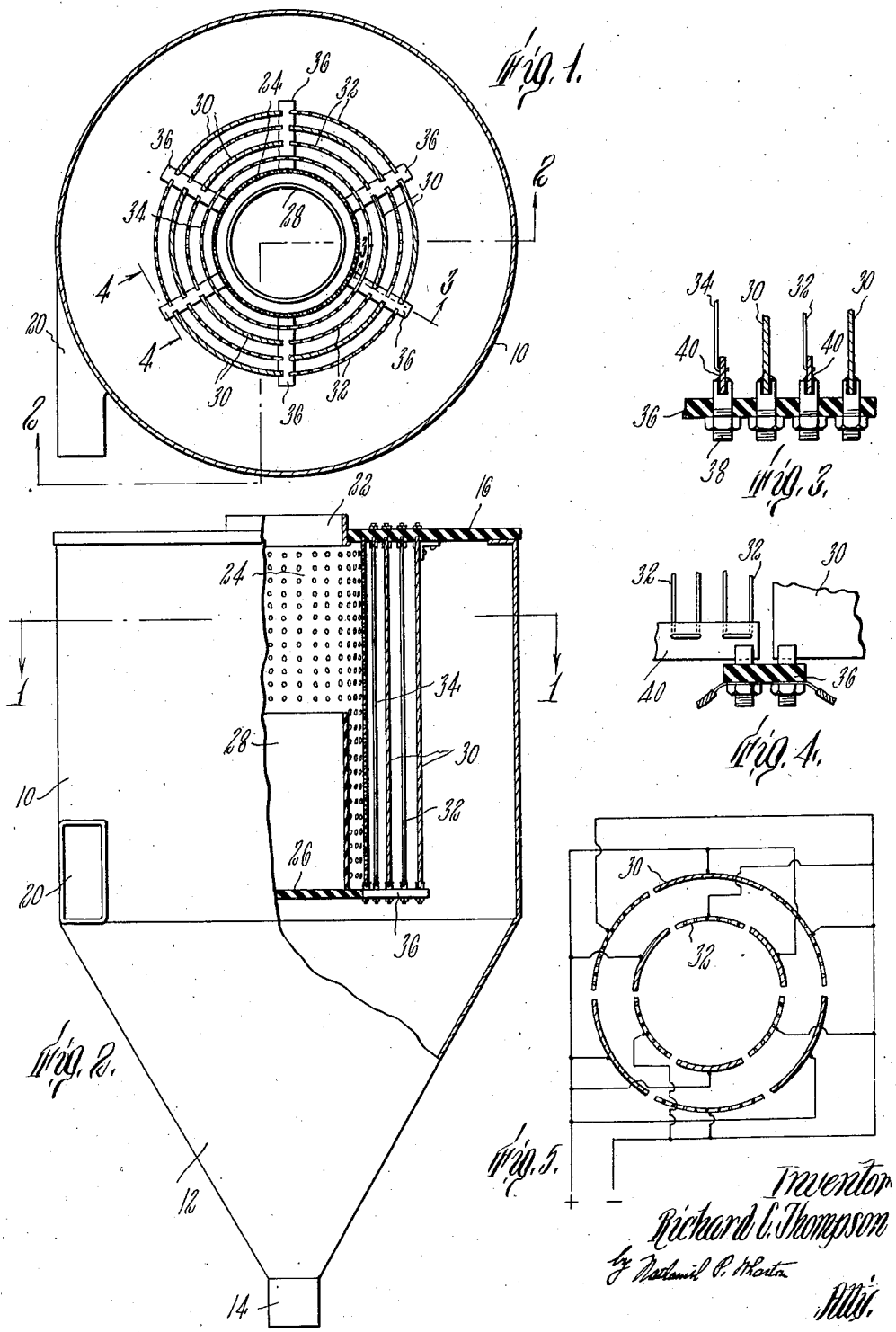

Patented Oct. 17, 1944

2,360,595

UNITED STATES PATENT OFFICE 2,360,595

APPARATUS FOR REMOVING SOLID PARTICLES FROM AIR STREAMS

Richard C. Thompson, Cohasset, Mass., assignor to Sturtevant Mill Company, Boston, Mass., a corporation of Massachusetts Application October 1, 1940, Serial No. 359,203

10 Claims. (Cl. 183—7)

This invention relates to apparatus for removing solid particles from a stream of air or other gases. It is an object of the invention to provide a simple and inexpensive apparatus adapted to separate from an air stream solid particles of all sizes and to perform such service more thoroughly and efficiently than apparatus heretofore designed for similar purposes. It is another object of the invention to provide an apparatus which is self-cleaning so that it can be operated continuously for long periods of time without any shut-downs for cleaning. It is a further object of the invention to provide an apparatus which operates effectively in removing heavy concentrations of dust from an air stream.

Mechanisms heretofore designed and constructed for removing solid particles from air streams without the aid of liquid sprays, cloth bags, oiled surfaces, and the like, are of two kinds, which may be designated cyclonic and electrostatic. The former usually consist of apparatus for introducing the air stream tangentially into a vertical cylindrical vessel so as to maintain a continuous vortex therein. The whirling motion of the air tends to throw the entrained solid particles outward against the wall of the vessel, the air itself following an inward spiral toward the central axis to be discharged through a central orifice. Such apparatus is, however, ineffective for particles less than 25 microns or so in diameter even when designed to operate with high static pressure, which is favorable for the removal of small sized particles, since the centrifugal effect on particles of such size is too slight to offset the inward movement of the spiralling air stream, so that most of the very fine particles are discharged with the air.

The electrostatic type of apparatus can be made effective for very fine dust particles, but air velocities through such apparatus must be kept very low and periodic shut-downs for cleaning are necessary, the frequency of such shut-downs depending on the quantity of dust carried by the stream.

According to the present invention, the best features of the cyclonic and electrostatic types are combined in a novel manner in a single apparatus capable of effectively removing particles of all sizes from an air stream passing through at relatively high velocity and low pressure, the apparatus being self-cleaning so that it can be operated continuously for long periods even when the air is laden with as much dust as it can carry.

For a more complete understanding of the invention, reference may be had to the following description of an embodiment thereof, and to the drawings of which Figure 1 is a section on the line 1—1 of Figure 2.

Figure 2 is an elevational view of an embodiment of the invention, a portion being broken away to show in section on the line 2—2 of Figure 1.

Figure 3 is a fragmentary section on the line 3—3 of Figure 1.

Figure 4 is a fragmentary section on the line 4—4 of Figure 1.

Figure 5 is a conventional wiring diagram for the inner element shown in Figures 1 and 2.

Figure 6:
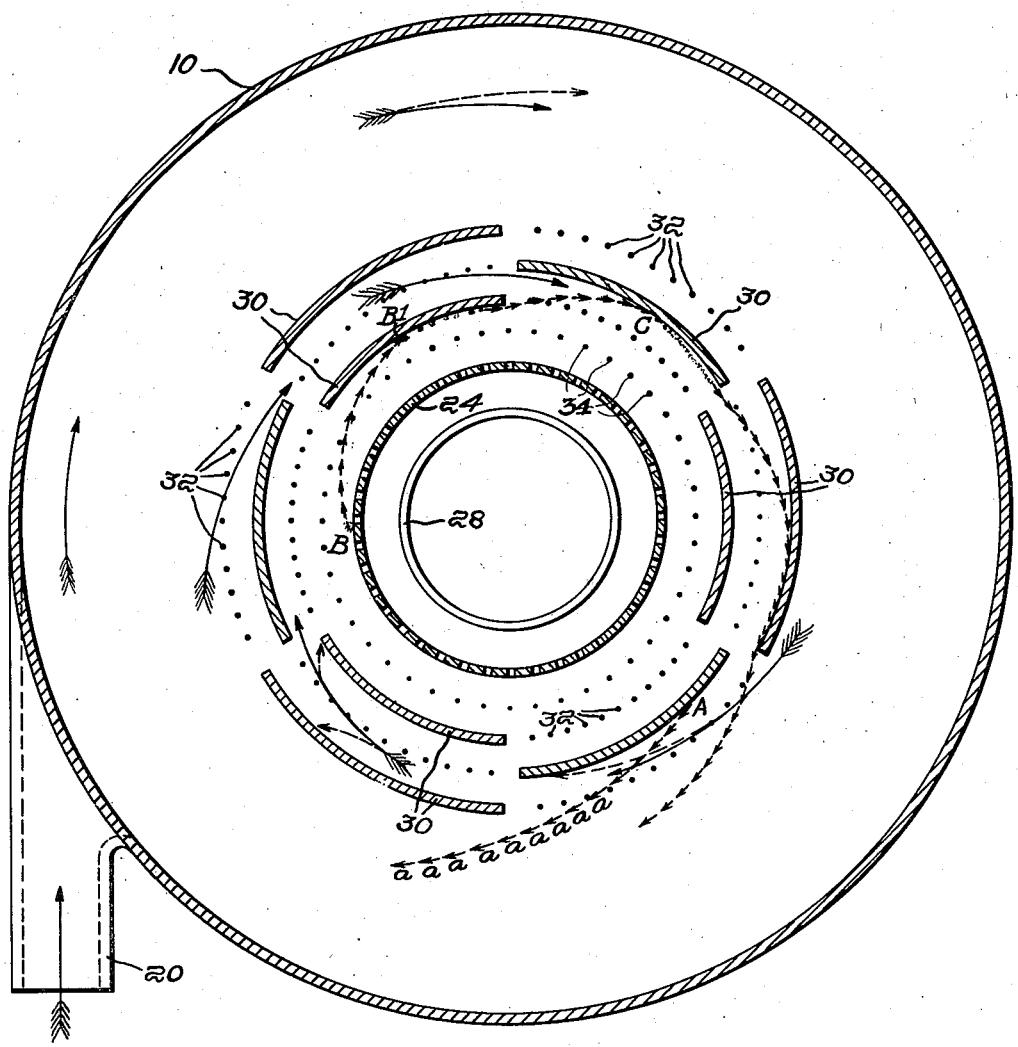
Fig. 6 is an enlargement of Fig. 1 with the supporting members omitted and includes arrows showing paths of travel of the air and of typical suspended particles.

As shown, the invention may be embodied in an apparatus comprising a cylindrical housing 10 which is preferably vertical. This housing has a lower conical portion 12 terminating in a relatively small outlet 14, which may discharge into a bag, bin or other container (not shown). The top of the cylindrical housing 10 is closed by a top plate 16 which is preferably of insulating material. The cylindrical housing 10 is provided with an inlet 20, which enters tangentially at the circumference of the housing and preferably adjacent to the lower end thereof. The housing is also provided with an outlet 22 through the top plate 16, this outlet being centrally located. Within the housing and coaxial therewith is a perforated cylinder 24 which registers with the outlet 22 and extends down from the top plate 16 to or nearly to the lower end of the cylindrical housing 10. The lower end of the inner cylinder 24 is closed by a bottom plate 26, on which may be mounted a baffle 28 extending from the plate 26 a substantial distance up toward the top of the housing. The object of this baffle is to equalize the air flow through the perforations in the cylinder 24. Without such baffle the air tends to flow more strongly through the lower perforations than through the upper perforations. While the baffle 28 is shown as a cylinder the wall of which is spaced a short distance inward from the wall of the cylinder 24, any other suitable shape such as the frustum of a cone may be employed, if desired.

The arrangement of the tangential inlet 20 and the axial outlet 22 results in a cyclonic or vortex movement of an air stream passing through the apparatus. The air enters at a substantial velocity through the inlet 20 and whirls around in an inward spiral path toward the axis of the housing, being finally discharged axially through the outlet 22. In this vortex of air are located a number of elements which are adapted to be electrically charged so as to establish and maintain electrostatic fields in the vortex. As shown, these elements may consist of plates 30 in the shape of cylindrical segments and of wires 32. These elements are preferably elongated and are parallel to the axis of the housing. A preferred arrangement is illustrated in Figures 1 and 2, this arrangement being in concentric circles surrounding the inner cylinder 24. In each such circle is a group of elements consisting of a plurality of segment plates and an equal number of sets of wires, these plates and sets of wires being arranged in alternation. Each of the other circles preferably has the same number of segments and the same number of sets of wires, the arrangement being such that each segment is directly opposite to a set of wires in the adjacent circles, and vice versa. As illustrated in Figure 1 by way of example, each segment and each set of wires extend through an arc of approximately 60° so that each circular group, with the exception of the innermost group 34 which is entirely of wires, consists of three segment plates and three sets of wires.

The segment plates 30 and the wires 32 and 34 may be supported in any preferred manner, care being taken to insulate the wires from the plates. As shown, six radial arms 36 of insulating material project from the edge of the bottom plate 26. Through these arms extend suitable bolts 38 to the upper ends of which are secured plates 30 or metal strips 40. Similar bolts are inserted through the top plate 16 to support the segment plates 30 and metal strips similar to the strips 40. The wires 32 and 34 extend between the upper and lower strips 40 and may be woven through holes in these strips as indicated in Figure 4, or may otherwise be attached to these strips. As indicated in Figure 5, suitable wiring connections may be provided for the purpose of connecting the plates 30 to a source of positive electricity so as to maintain a positive charge on all of the plates 30. The inner cylinder 24 is also preferably connected to the plates 30 so as to have a positive charge thereon. The wires 32 and 34 in like manner are all connected to a source of negative electricity so as to maintain on the wires a negative charge. The proper voltage of these charges depends, for one thing, on the spacing between the wires and segment plates. For example, if the plates and wires are separated by a distance of about 1 inch, a charge of approximately 15,000 volts is suitable for the positive charge on the plates and for the negative charge on the wires. The insulation shown in Figures 3 and 4 is conventionally indicated, it being understood that the insulation and spacing employed in actual structures is properly designed to prevent arcing between the oppositely charged elements.

The operation of the apparatus is as follows: Air is introduced through the inlet 20 at a considerable velocity, which maintains a spiral movement of the air within the housing. The air entering the housing thus moves gradually inward as it whirls around until it passes through the perforations in the cylinder 24, such perforations having such a total area considerably in excess of the area of the outlet 22 so that undue static air pressure within the housing is thus avoided, high static pressure being unnecessary for effective performance of the apparatus. The spiral path of the air stream is somewhat modified at the inner end of the spiral by the presence of the segment plates 30, these plates preventing inward movement of the air during brief portions of its travel within the housing. Thus the air actually follows a path which may be described as a stepped inward spiral. The whirling movement of the air within the housing, before it contacts with the electrical elements of the apparatus, tends to throw solid particles entrained in the stream outward against the wall of the housing, this being due to the tendency of every moving object to continue its movement in a straight line and at a constant speed unless acted upon by some exterior force. The particles in the stream which are larger than a critical size or mass (which depends upon such factors as the velocity of the air stream, the temperature and viscosity of the air and the density of the particles), are actually thrown out against the wall of the housing by the centrifugal action of the whirling movement, these particles dropping down by gravity into the collecting cone 12 from which they are discharged through the outlet 14. The primary removal of the relatively larger or coarser particles is of considerable importance in that, not only is the electrical phase of my apparatus relieved of a great portion of the load or work to which it would otherwise be put, but further that mechanical damage and/or short-circuits to the electrical elements, such as might otherwise be caused by bits of string, pieces of wood, etc., are obviated. Indeed, it is the primary mechanical or centrifugal elimination of variously-sized particles, including not only the relatively large or coarse particles but also entrained fine particles and coalesced fine colloidal particles or flocs, that makes possible the efficient functioning of the apparatus hereof in practically completely removing heavy concentrations of dirt from dust-laden air and other gases. Particles smaller than the critical size or mass are carried inward with the air stream, since the centrifugal effect thereon is insufficient to result in enough outward migration through the air to overcome the inward component of movement of the air stream in which they are carried. During such inward movement, the small particles pass between the wires of the outermost part of the electrical portion of the device and so come into the influence of the electrostatic fields maintained by the charges on the segment plates 30 and the wires 32 and 34. In these fields many of the particles coalesce into comparatively large flocs and, as flocs acquire enough mass to be operated on by centrifugal force, wherefore, they pass out between the wires of a subsequent surrounding segment of the circle and, once outside the electrical field, these flocs act exactly as the larger particles in the primary cleaning stage hereinbefore described. Others of the small particles are precipitated out on one or another of the various segmental plates 30 whereon they rest and accumulate, gradually absorbing the charge of the plates. After a little while, the combination of electrostatic repulsion and the wiping action of the air passing over the plate removes the accumulated particles as flocs of comparatively large dimensions. If the accumulation under consideration happens to be on one of the inner plates or on the innermost perforated cylinder, it probably will not pass directly out into the collecting zone between the electrical unit and the outer shell 10 but it may be collected on the inner side of the plates of a previous stage of electrical unit and thus gradually work its way out into the collecting zone; or, before reaching the collecting zone, these accumulations or flocs may be acted on by gravity so that they fall out of the electrical unit between the spider bars 36 and thus pass to the material discharge 14. Thus the apparatus is self-cleaning in that accumulations of small particles are not permitted to remain on the charged surfaces so as to interfere with the effectiveness of the charges in maintaining electrostatic fields. The apparatus can thus be effectively run for indefinite periods of time, the solid material being discharged through the outlet 14 and the purified air being discharged through the upper outlet 22.

In one aspect, the apparatus hereof may be considered as involving means for forcing a gas stream laden with particulate matter to follow an inwardly spiralling course, thereby initially casting out by centrifugal action relatively coarse particles therefrom, and of simultaneously exposing subsequent or inner stages of the inwardly spiralling gas stream to an electrostatic field capable of flocculating relatively fine particles on stationary surfaces swept by the air stream while they build up into flocs of sufficient mass to be picked off by said air stream and cast out centrifugally along with the first-named relatively coarse particles. It may be also noted that upon transformation of the relatively fine particles through electrostatic forces into flocs of sufficient mass so that they can be further acted upon by the air stream and by centrifugal force as just described, such flocs are caused to assume an outwardly spiralling path of the same direction of rotation as the inwardly spiralling path of the gas stream.

Fig. 6 illustrates this action more clearly. Here the solid arrows indicate paths taken by the air stream to be cleaned. The dotted arrows show how the larger particles leave this stream under the action of centrifugal force. The carets indicate the manner in which agglomerated particles work their way out of the electro-static apparatus of the machine into the purely centrifugal portion of it where they are discharged along with the coarser particles. A simple example of this action is in the case of an agglomerate formed on the outer side of the second row of plates, as indicated at A. When a mass formed at this point has so increased in size that the friction of the air stream picks it up and carries it along, it is moved along the path $aaa$ into the cyclone where it is discharged in the same way as are the heavier particles. Probably the most complex course would be that of a floc formed on the outer surface of the perforated cylinder 24, say at the point B. This might travel to point $B_1$ on the inner surface of a plate 30 in an earlier separating stage or outer convolution of the vortex. At this point its movement might conceivably be arrested and the agglomerating action above described might proceed to a further point before it would be picked up again by the air stream. Very likely it would then roll along the plate to the edge, finally coming off and, due to centrifugal force, landing on another plate at the point C in a convolution still farther outwardly from that in which the initial precipitate was deposited. This operation may then be repeated for any number of succeeding stages until the agglomerate finally escapes into the centrifugal zone outside the electro-static field. There it would be handled exactly as a particle of the coarser material.

It is evident that various modifications and changes may be made in the embodiment of the invention shown and described without departing from the spirit or scope thereof as defined in the following claims.

I claim:

1. An apparatus for separating solid particles from an air stream, which comprises a vertical cylindrical housing with a top central outlet and a tangential inlet, a perforated inner cylinder coaxial with said housing and registering with said outlet, a plurality of cylinder segments arranged about said inner cylinder and coaxially therewith, said segments being spaced from said inner cylinder and from each other, vertical wires disposed in spaces between said inner cylinder and said segments, means electrically insulating said wires from said segments, and means for maintaining electrical charges of opposite signs on said wires and segments respectively.

2. An apparatus for separating solid particles from an air stream, which comprises a vertical cylindrical housing having a tangential inlet entering at the circumference of the housing near the lower end thereof and a central outlet in the upper end thereof, a perforated inner cylinder mounted coaxially within the housing and registering with said outlet, a plurality of electrically insulated elements mounted within the housing between the inner cylinder and the wall of the housing, means for maintaining electrical charges on said elements, and a baffle within the inner cylinder extending from the lower end thereof a substantial distance toward the upper end to equalize the air flow through the perforations of said inner cylinder.

3. An apparatus for separating solid particles from an air stream, which comprises a vertical cylindrical housing with a tangential inlet at its circumference and a central outlet at its upper end, an inner coaxial perforated cylinder mounted in said housing in registry with said outlet, a series of groups of elongated metallic elements parallel to the axis of the housing and arranged in concentric circles between the inner cylinder and the wall of the housing, each said group consisting of spaced cylindrical segments alternating with sets of parallel wires, and means for maintaining electrical charges of opposite signs on the segments and wires respectively.

4. A continuous self-cleaning, cyclonic, electrostatic precipitator, comprising an approximately cylindrical casing provided with a tangential inlet for a stream of dust laden air and a central air outlet so arranged that said air stream assumes an inwardly spiralling or vortex form in flowing through the casing, electrodes so positioned in said casing as to form a plurality of discontinuous boundaries partially separating inner convolutions of the path taken by said air stream from each other and from outer convolutions thereof, certain of said electrodes being spaced from but opposed to others, means for electrically charging said electrodes whereby the particles of solid material carried by the air stream passing between the electrodes become ionized and are precipitated on certain of the electrodes, said boundaries having spaces therethrough for the outward escape of solid particles from said air stream and said casing having an outlet for the solid materials so separated from said air stream.

5. In a continuous cyclonic electro-static precipitator according to preceding claim 4, a construction in which said electrodes are positioned in a cylindrical space centrally disposed in said casing but separated from the casing by an annular space of considerable radial width into which said dust laden air stream is initially delivered, said space forming a preliminary separating zone in which the coarser particles of solid material are thrown out of the air stream centrifugally before said stream comes into the field of influence of said electrodes, and also serving as a collecting zone for agglomerates of fine particles formed by the electro-static forces.

6. A continuous self-cleaning, cyclonic, electro-static precipitator, comprising an approximately cylindrical casing provided with a tangential inlet for a stream of dust laden air and a central air outlet so arranged that said air stream assumes a spiral or vortex form in flowing through the casing, a plurality of electrodes positioned in said casing and spaced to form a plurality of discontinuous boundaries for contiguous, communicating and concentric portions of the spiral path which said air follows in passing through the casing, certain of said electrodes being of the plate type, ionizing electrodes radially spaced from and opposed to said plate electrodes and cooperating with the later to ionize solid particles in the air stream as it follows said path, said electrodes being arranged in approximately concentric circles with the plates in one circle staggered with reference to those in an adjacent circle, and means for electrically charging said electrodes, said casing having an outlet for the solid materials separated from said air stream.

7. A continuous cyclonic electro-static precipitator comprising a substantially cylindrical upright casing provided with a tangential inlet for a stream of dust laden air and a central air outlet so arranged that said stream assumes an inwardly spiralling or vortex form in flowing through the casing, a plurality of plate electrodes positioned in said casing to form a discontinuous boundary for contiguous concentric portions of the spiral path which said air follows in passing through the casing, said plates being so spaced apart to permit the escape outwardly between them along an outwardly expanding spiral path of solid particles of material centrifugally discharged from the air stream, ionizing electrodes cooperating with said plates to ionize said solid particles, said ionizing electrodes being pervious to the passage therethrough of said particles, means for electrically charging said electrodes, said casing having an outlet for the discharge of the solid materials so separated from said air stream.

8. In a continuous cyclonic electro-static precipitator according to preceding claim 7, a construction in which a cylindrical ionizing electrode, pervious to the passage therethrough of air and particles entrained therewith, is positioned inside the innermost circle of said plates and electrodes, and means for electrically charging said plates positively and said ionizing electrodes negatively.

9. In a continuous cyclonic electro-static precipitator according to preceding claim 7, a construction in which said electrodes are positioned in a cylindrical space centrally disposed in said casing but separated from the casing by an annular space of considerable radial width into which said dust laden air stream is initially delivered, said space forming a preliminary separating zone in which the coarser particles of solid material are separated from the air streams before said stream comes into the field of influence of said electrodes, and also serving as a collecting zone for agglomerates of fine particles formed by the electro-static forces.

10. An apparatus for separating particulate matter from an air stream, comprising a cyclonic separator structure in which said stream assumes the form of an inwardly spiralling vortex, and electrostatic means for precipitating said particulate matter including a plurality of plates positioned in said vortex, curved about the axis of the vortex, and dividing said stream into substantially concentric convolutions, said plates forming electrode elements of said electrostatic means and being elements on which said matter is precipitated.

RICHARD C. THOMPSON.